United States Patent Office 3,385,908
Patented May 28, 1968

3,385,908
FLAME RETARDANT PHENOLIC POLYGLYCIDYL
ETHER RESIN COMPOSITIONS
Carl G. Schwarzer, Walnut Creek, Calif., assignor to
Shell Oil Company, New York, N.Y., a corporation of
Delaware
No Drawing. Filed Apr. 9, 1965, Ser. No. 447,057
5 Claims. (Cl. 260—830)

ABSTRACT OF THE DISCLOSURE

New epoxy ethers capable of being cured to form flame resistant castings and coating are obtained by reacting a methylol-substituted halobicycloheptenyl bisphenol with an epoxy-halo-substituted alkane or a dihalo-hydroxy substituted alkane in the presence of an alkaline material.

---

This invention relates to a new class of epoxy compounds. More particularly, the invention relates to novel methylol substituted flame retardant epoxy ethers, their preparation and the products obtained therefrom.

It is known that liquid epoxy ethers obtained by reacting polyhydric phenols with halogen containing epoxides or dihalohydrins in the presence of an alkaline medium are useful in the preparation of castings and coating compositions. These epoxy ethers may be cured to form polymers which are very hard and durable and have excellent electrical resistivity and inertness to chemicals. Such polymers are especially useful in the formation of castings or coatings for surfaces which are exposed to moisture, salt water, sunlight, heat, chemicals, etc. However, it has also been found that one drawback in the application of the polyepoxide resins is their susceptibility to burning when exposed to flame, thereby, inhibiting the widespread use of these materials where there is a possibility of their being ignited.

It has also been found that these epoxy ethers react at a relatively low rate at lower temperatures, and thus their applications where curing techniques are necessary at lower temperatures are somewhat limited. In addition, the cured polymers of the epoxy ethers described above often have heat distortion points that are lower than desirable for applications where the products are exposed to heat.

It is an object of this invention to provide novel flame retardant epoxy ether resins. It is also an object of the invention to provide epoxy ethers which may be cured rapidly at relatively low temperatures. It is a further object of the invention to provide cured flame retardant polymers of epoxy ethers which have relatively high heat resistance, as well as resistance to solvents and chemicals. These and other objects will become apparent from the following description of the invention.

There have now been discovered novel epoxy ethers which accomplish the above objects. The new ethers of the invention are ethers of epoxy-substituted alcohols and halobicycloheptenyl bisphenols substituted on at least one ring carbon atom with a methylol group.

The preferred epoxy ethers are the glycidyl polyethers of the formula:

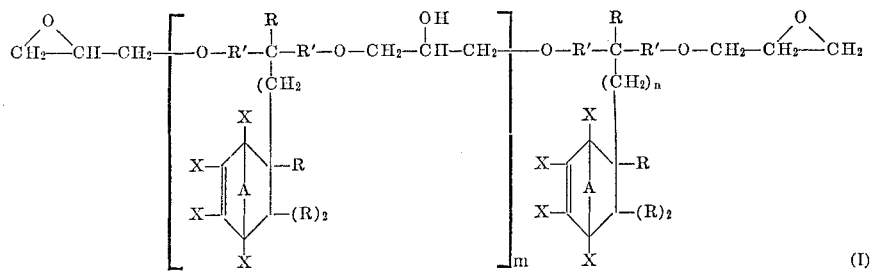

wherein each R' is an unsubstituted aromatic radical or a methylol-substituted aromatic radical and with at least one R' being the latter; each R is hydrogen or a lower alkyl of 1–4 carbon atoms; X is chlorine or bromine; $m$ is an integer from 0 to 10; $n$ is an integer from 0 to 6; A is selected from —$CH_2$— and —$CX_2$—, the latter being preferred. While for any single molecule, $m$ is an integer, the epoxy ethers will generally not be a single simple molecule, but a complex mixture of glycidyl polyethers where the value of $m$ varies between individual molecules.

These flame retardant epoxy ethers are preferably prepared by reacting a methylol-substituted halobicycloheptenyl bisphenol with an epoxy forming material in the presence of an alkaline material.

The methylol-substituted halobicycloheptenyl bisphenols used in preparing the epoxy ethers are those having at least one, and preferably two, and up to four methylol groups attached to the ring carbon atoms of the bisphenol. These methylol substituted bisphenols are of the formula:

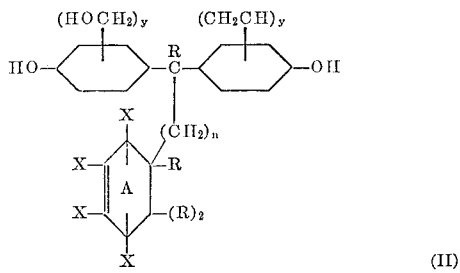

where $y$ is 0–2 and at least one $y$ is 1 or more and X, R, $n$, and A are the same as described above.

These methylol-substituted halobicycloheptenyl bisphenols are preferably prepared by reacting the unsubstituted halobicycloheptenyl bisphenol with formaldehyde in the presence of an alkaline catalyst. The formaldehyde is preferably utilized in the form of an aqueous solution, such as conventional 37% formalin solution. The formaldehyde and bisphenol are preferably combined in such quantities as to furnish approximately one mole and up to 5–10% molar excess of formaldehyde for every ring carbon atom to be reacted. Thus, a monomethylol-substituted product is obtained by the use of the reactants on a mole to mole basis, while the dimethylol-substituted products are obtained by using two moles of formaldehyde per mole of the bisphenol, etc.

The alkaline catalysts employed in the reactant are preferably alkali metal or alkaline earth metal hydroxides and employed in amounts of from about 0.1% and 10% by weight of the reactants.

Solvents may also be utilized in the preparation of the methylol-substituted bisphenols. Solvents which are compatible with the phenol, such as methanol, ethanol, ketones, etc., are suitable. The amount of solvent used may vary in general from 10% to 60% by weight of the reactants.

Reaction temperatures may vary depending on the desired rate of reaction. The reaction takes place slowly at room temperature or below and faster at higher temperatures. Preferable reaction rates are obtained by employing temperatures between about 50 and 100° C.

Upon completion of the reaction, the alkaline catalyst is neutralized by the addition of acid material, such as dilute sulfuric or hydrochloric acid and the solvent removed by distillation.

By methylol-substituted as used herein is also meant the substituted methyiol groups, such as —CHOR groups where R is preferably a lower hydrocarbyl or substituted hydrocarbyl as —CHOHCH₃ and —CHOHCH=CH₂. These substituents are obtained by substituting other aldehydes such as acetaldehyde, acrolein, chloral, etc., for formaldehyde and using more stringent reaction conditions. However, formaldehyde is the preferred reactant.

The halobicycloheptenyl bisphenols are prepared by condensation of a halo-substituted bicyclic carbonyl of the formula

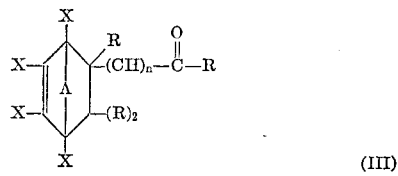

(where X, A, R and $n$ are as set forth above) with phenol in the presence of an acid catalyst. The condensation proceeds under conditions wherein one molecule of the carbonyl condenses with two molecules of phenol in the presence of a sufficient amount of strong acid as disclosed generally by Martin, The Chemistry of Phenolic Resins (1956), and U.S. Patent Nos. 2,602,821 and 2,602,822. The reaction may take place at temperatures between about 45 and 140° C., and preferably between about 45 and 80° C. Suitable halo-substituted bicyclic carbonyls are prepared by reacting together tetra- or hexa-halo-1,3-cyclopentadiene, where the halogens are chlorine or bromine with a lower 2-alkenal or alkenone, thereby producing a 1:1 adduct. The halo-substituted bicyclic aldehydes and their preparation are disclosed in U.S. Patent No. 2,761,879. Preparation of a halo-substituted bicyclic ketone and the halobicycloheptenyl bisphenols is described in copending application Ser. No. 447,091, filed Apr. 9, 1965 the pertinent portions thereof which are incorporated herein by reference.

The novel flame retardant epoxy ethers are obtained by reacting the above described methylol-substituted halobicycloheptenyl bisphenols with epoxy forming materials such as halo-epoxy-substituted alkanes, and dihalo-hydroxy-substituted alkanes, preferably in the absence of large amounts of water. The expression "halo-epoxy-substituted alkanes" as used herein refers to those alkanes having a vic-epoxy group

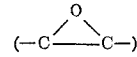

attached directly to a halogen bearing carbon atom. Some examples include epichlorohydrin, epibromohydrin, 1,4-dichloro-2,3-epoxybutane, 1-chloro-2,3-epoxypentane and the like. The expression "dihalo-hydroxy-substituted alkane" as used herein, refers to those alkanes having a series of three carbon atoms, one of which is attached to a halogen atom, the next is attached to a hydroxyl group, and the last attached to a halogen atom, for example 1,3 - dichloro-2-hydroxypropane, 2,4-dibromo-3-hydroxypentane, 2,4-dichloro-3-hydroxy-butane, and the like. In either of these two types of reactants, those substituted alkanes containing no more than 12 and preferably from 3–8 carbon atoms are used. Epichlorohydrin comes under special consideration because of its low cost and because of the superior properties of the epoxides obtained therefrom.

The amount of bisphenol and epoxy forming material to be employed in the reaction will vary depending on the type of product desired. If a simple monomeric type product is desired (where $m=0$ in Formula I) the bisphenol and epoxy forming material are preferably reacted in chemical equivalent ratios varying from 1:4 to 1:8. If higher molecular weight epoxy ethers are desired ($m>0$), the epoxy forming materials are used in smaller amounts and the ratio varies from about 1:1.1 to 1:2. The term "chemical equivalent" refers to the amount needed to furnish one OH group for every epoxy group.

The desired alkalinity for the bisphenol-epoxy forming material reaction is obtained by adding basic compounds such as sodium or potassium hydroxide, preferably in slight stoichiometric excess (e.g., in excess of one mole of alkali per phenolic OH group) to the reaction mixture. The reaction is preferably conducted by heating the reaction mixture at temperatures between about 50° and 150° C., and more preferably from about 60° to 125° C. Atmospheric, super-atmospheric, or subatmospheric temperatures may be utilized as desired.

The water formed in the reaction may be removed during or at the end of the reaction. At the completion of the reaction, the water and excess reactants are preferably removed by distillation, and the residue then treated with an appropriate solvent such as benzene and the solution filtered to remove the salt. The product may then be purified by any suitable method, such as extraction, if desired.

The novel flame retardant methylol-substituted epoxy ethers of the invention are fluid or viscous liquids or solids depending on the molecular weight of the resin. They have more than one epoxy group per molecule and have a very high halogen content thereby providing a high degree of fire retardance per unit weight of the resin. The halogens are present only in the halobicycloheptenyl moiety of the resin molecule and thereby do not interfere with the functionability of the reactive epoxy and methylol groups. In addition, the halogen atoms are substantially separated from reactive hydrogen atoms present in the molecule and thus, possible reactivity therewith to produce undesirable hydrogen halides which are extremely corrosive is minimized.

The novel glycidyl ethers may be polymerized alone or with other polyepoxide materials such as glycidyl polyethers of polyhydric phenols obtained by reacting polyhydric phenols, such as bisphenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides.

The great variety of different epoxy curing agents may be used in effecting the above-described homo- and copolymerizations. Examples of the curing agents include, among others, alkalies like sodium or potassium hydroxide; alkali phenoxides like sodium phenoxide; carboxylic acids or anhydrides, such as phthalic anhydride, tetrahydrothalic anhydride; Nadic methyl anhydride, chlorendic anhydride, pyromellitic anhydride, trimellitic anhydride, succinic anhydride, maleic anhydride, octadecenylsuccinic anhydride, etc., and mixtures thereof; dimer or trimer acids derived from unsaturated fatty acids, 1,20-eicosanedioic acid, and the like; Friedel-Crafts metal halides, such as aluminum chloride, zinc chloride, ferric chloride, or boron trifluoride as well as complexes thereof with ethers, acid anhydrides, amines, ketones, diazonium salts, and those disclosed in U.S. 2,824,083; salts such as zinc fluoborate, magnesium perchlorate, zinc fluosilicate; phosphoric acid and partial esters thereof, including n-butyl orthophosphate, diethyl ortho-phosphate and hexaethyltetraphosphate; aliphatic, aromatic and heterocyclic amino compounds, such as, for example, diethylene triamine, triethylene tetramine, tetraethylene pentamine, hexamethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N,N-diethyl-1,3-propane diamine, 1,2-diamino-2-methylpropane, 2,3 - diamino - 2-methylbutane, 2,4-diamino-2-methylpentane, 2,4 - diamino-2,6-diethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2,6 - diaminopyridine, diaminodiphenylmethane, P,P' - aminodiphenylsulfone, triaminobenzene, ortho-, para- and metaphenylene diamine, methylene dianiline, diaminotoluene, diamino-diphenyl, diamino-stilbene, 1,3-diamino-4-isopropyl benzene, and the like, and soluble adducts of amines and polyepoxides and their salts, such as described in U.S. 2,651,589 and U.S. 2,640,037. Also included are the amino-amides obtained by reacting polybasic acids with polyamines such as described in U.S. Patents 2,450,940, and 2,695,908.

The amount of the curing agents employed may vary over a considerable range, such as from 1% to 200% by weight of the polyepoxide, with the exact range depending on the particular type of agent selected. With curing agents having replaceable hydrogen, such as the amine agents, amounts of agent generally employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the materials being polymerized. With the phosphoric acid and esters, particularly preferred amounts vary from about 1% to 10% by weight. The amino compounds are preferably employed in amounts varying from about 3% to 25% and the salts of the inorganic acids, such as the salts of fluoboric acid, are preferably employed in amounts varying from about 3% to 20% by weight. The other curing agents are preferably employed in amounts varying from 1% to 20% by weight. Where the anhydride curing agents are used, it is often desirable to add small amounts of a promotor to hasten the cure (0.1–5% by weight of the total composition). Suitable promotors include for example tertiary amines such as benzyldimethylamine, octoates such as stannous and zinc octoate, alkyl sulfides, phosphines such as triphenyl phosphine, quaternary ammonium salts, etc.

The epoxy ethers and their high molecular weight derivatives may also be cured through the hydroxyl group by the addition of appropriate amounts, e.g., 1% to 25% by weight of polybasic acids or anhydrides, polyisocyanates, and the like.

The curing is preferably effected by mixing the curing agent with the epoxy ether at temperatures ranging from about 0° C. to 200° C. The curing is accelerated by heat and when fast cures are desired temperatures ranging from about 50° C. to 200° C. are used. As noted above, one of the advantages of the new epoxy compounds is their ability to cure at low temperatures which is especially useful for surface coatings, for example, when cured with a polyamide. In this case, the cure is effected at temperatures from about 0° C. and 60° C., and preferably from 20° C. to 50° C. However, in the preparation of high strength laminates, the higher temperatures are preferred.

In some cases, and particularly in the preparation of castings, the new flame retardant epoxy ethers are soft to brittle solids, and it may be advantageous to employ some type of diluent during their utilization. These diluents are preferably of the reactive type, i.e., those which may enter the reaction. Examples include monoglycidyl compounds such as alkyl glycidyl ethers (butyl glycidyl ether), or aryl glycidyl ethers (phenyl glycidyl ether). Other examples include the glycidyl ethers of dihydropyranalkanols, acetonitrile, acrylonitrile, mono- and dimethylol phenyl glycidyl ethers and the mono- and dicresyl or vinyl phenyl glycidyl ethers as well as fluid polyepoxide materials (diglycidyl aniline, etc.). The diluents are preferably used in amounts from about 0.1% to as high as 30% or higher by weight.

If the new polyepoxides and their higher molecular weight derivatives are to be used in the preparation of castings or pottings, the curing agent and the epoxy material are generally combined together and then poured into the mold or casting which may if desired contain additional material, such as electrical wires or apparatus, and the mixture heated to effect the cure.

The new polyepoxides and their higher molecular weight derivatives may also be employed with the aforedescribed curing agents to prepare improved surface coating compositions of the air-drying or baking type. In utilizing the products for this application, it is generally desirable to combine the epoxy material and curing agent forming materials and driers, and then apply the resulting mixture to the surface to be coated. Film-forming materials that can be used with the epoxy material in this manner include the drying oils, such as tung oil, linseed oil, dehydrated castor oil, soybean oil, and the like; cellulose derivatives such as cellulose nitrate, cellulose acetate, cellulose acetate butyrate, cellulose propionate, ethylcellulose, and mixtures thereof; and vinyl polymers, such as polymers of vinyl chloride, vinylidene chloride, methyl methacrylate, diallyl phthalate, and the like. The coatings prepared in this manner may be allowed to set to a hard finish at room temperature or heat may be applied to hasten the cure.

The higher molecular weight hydroxy-containing derivatives of the new polyepoxides as described above are particularly suited for use in preparing coating compositions as described above, as they may be reacted through the hydroxyl group or groups with drying oil fatty acids or may be cured through the hydroxyl groups with compounds such as methylol urea or melamines or diisocyanates.

The new polyepoxides and their higher molecular weight derivatives may also be employed with the curing agents to prepare valuable adhesive and impregnating compositions. If the new monomeric products are used for this application they may be used as such without the use of a diluent, while the higher molecular weight products may be used with solvents, such as benzene, toluene, acetonitrile, and the like. The curing agent is then added to the spreadable mixture and the mixture applied to the desired surface.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

Example I

One mole (499 g.) of bis(hydroxyphenyl)-[1,4,5,6,7,7-hexachlorobicyclo(2.2.1)-5-heptene-2]methane was dissolved in 10 moles (320 g.) of methanol to which solution was added 81 grams of 37% formaldehyde (1 mole) and 40 grams (1 mole) sodium hydroxide dissolved in 45 grams $H_2O$. The composition was refluxed for 40 minutes. The resulting methyolated bisphenol product was dissolved in 400 g. methanol and 2000 g. epichlorohydrin. The solution was heated to 60° C. and 40 g. sodium hydroxide dissolved in 45 g. $H_2O$ was added. The reaction mixture was refluxed for ½ hour after which time the volatiles were removed at 120° C. and 15 mm. pressure. The product was dissolved in 150 cc. methyl isobutyl ketone and one liter of 5% sodium hydroxide solution was added, the mixture was allowed to react for ½ hour at 50° C. The organic phase was separated and washed with 1 liter of 5% aqueous monosodium phosphate solution. The layers were separated and the solvent was removed at 125° C. and 2 mm. pressure. The amount of the dark viscous liquid resin recovered was 584 g. which was 91% theory (641 g.) and had the following analysis:

Found: Epoxy (equiv./100 g.), .286; hydroxyl (equiv./100 g.), .16; chlorine (percent by weight), 29.7. Calculated: Epoxy (equiv./100 g.), .313; hydroxyl (equiv./100 g.), .156; chlorine (percent by weight), 33.2. The composition was a mixture of glycidyl polyethers as represented by Formula I. The predominant compound was the diglycidyl ether having the formula

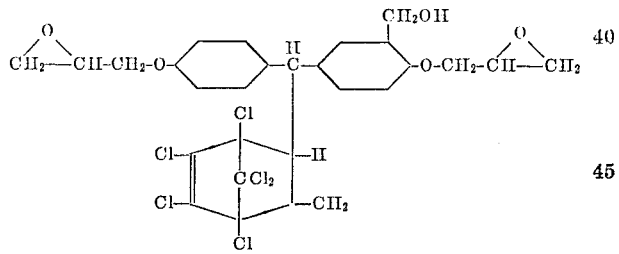

The above diglycidyl ether (100 g.) was thoroughly mixed with 8 g. of meta-phenylenediamine. The mixture was cured at 80° C. for 2 hours and 150° C. for 2 hours and had a heat distortion temperature of 122° C. Additional curing at 200° C. for 4 hours resulted in a heat distortion point of 184° C. The resins were brittle solids and were self-extinguishing when exposed to flame.

Example II

A mixture of 70 g. of the glycidyl ether used in Example I, 30 g. of EPON 828 (Shell Chemical Company) liquid glycidyl polyether prepared by reacting epichlorohydrin and 2,2-bis(4-hydroxyphenyl)propane and having the following properties Avg. molecular weight _____ 380
Hydroxyl content (equiv./100 g.) _____ 0.06
Epoxide (equiv./100 g.) _____ 0.52–0.55 and 10 g. meta-phenylene diamine was cured as set forth in Example I. The heat distortion points of the cured resin were 135 and 167° C., respectively. The resin was self-extinguishing in the presence of flame.

Example III

A mixture of 65 g. of the glycidyl ether of Example I, 35 g. Nadic methyl anhydride, and 1 g. benzyldimethylamine was cured at 120° C. for 1 hour and 200° C. for 4 hours. The resin had a heat distortion point of 127° C. and was self-extinguishing in the presence of flame.

By way of comparison 100 grams of EPON 828 and 14.7 grams of meta-phenylenediamine cured at 80° C. for 2 hours, 150° C. for 2 hours and 200° C. for 4 hours has a heat distortion point of 158° C. EPON 828 (100 g.) cured with 90 g. Nadic methyl anhydride at 200° C. for 4 hours has a heat distortion point of 100° C. Neither of these cured resins is flame retardant.

I claim as my invention:
1. A polyglycidyl ether of a methylol substituted bisphenol of the formula

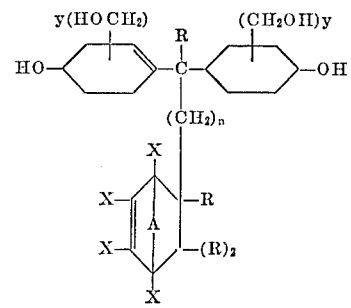

wherein each R is selected from the group consisting of hydrogen and an alkyl of 1–4 carbon atoms,
X is chlorine or bromine,
A is selected from the group consisting of —$CX_2$— and —$CH_2$—,
n is an integer from 0 to 6 and
y is an integer from 0 to 2 at least one y being at least 1.
2. A glycidyl polyether of the formula

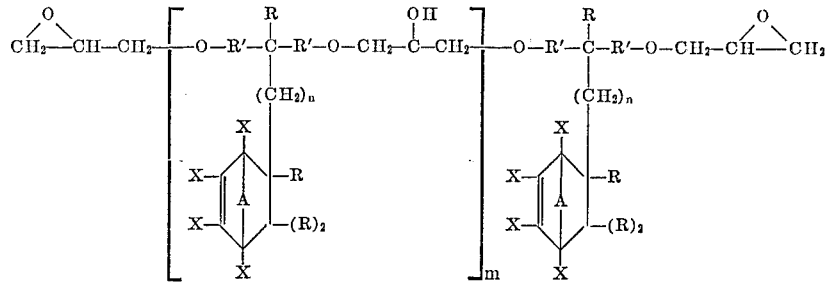

wherein each R' is a phenylene ring at least one of which is methylol-substituted, R is selected from the group consisting of hydrogen and an alkyl of 1–4 carbon atoms,
X is chlorine or bromine,
A is selected from the group consisting of —$CX_2$— and —$CH_2$—, $n$ is an integer from 0 to 6 and
$m$ is an integer from 0 to 10.

3. A glycidyl ether of the formula

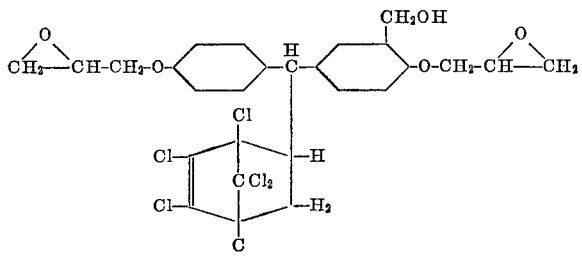

4. A flame retardant product obtained by reacting the epoxy ether of claim 1 with an epoxy resin curing agent.

5. A flame retardant product obtained by reacting a mixture of an epoxy ether defined in claim 1 and a dissimilar polyepoxide with an epoxy curing agent selected from the group consisting of polyamines, amino-containing polyamides, polycarboxylic acids and their anhydrides, boron trifluoride and its complexes and metal salts.

References Cited

UNITED STATES PATENTS 2,761,879   9/1956   Soloway _____ 260—47 XR

WILLIAM H. SHORT, *Primary Examiner.*

T. D. KERWIN, *Assistant Examiner.*